June 18, 1968   R. T. BURNETT   3,388,776
TRANSVERSELY MOVABLE, OPPOSING, RIM GRIP BRAKE
Filed Dec. 23, 1963   4 Sheets-Sheet 4
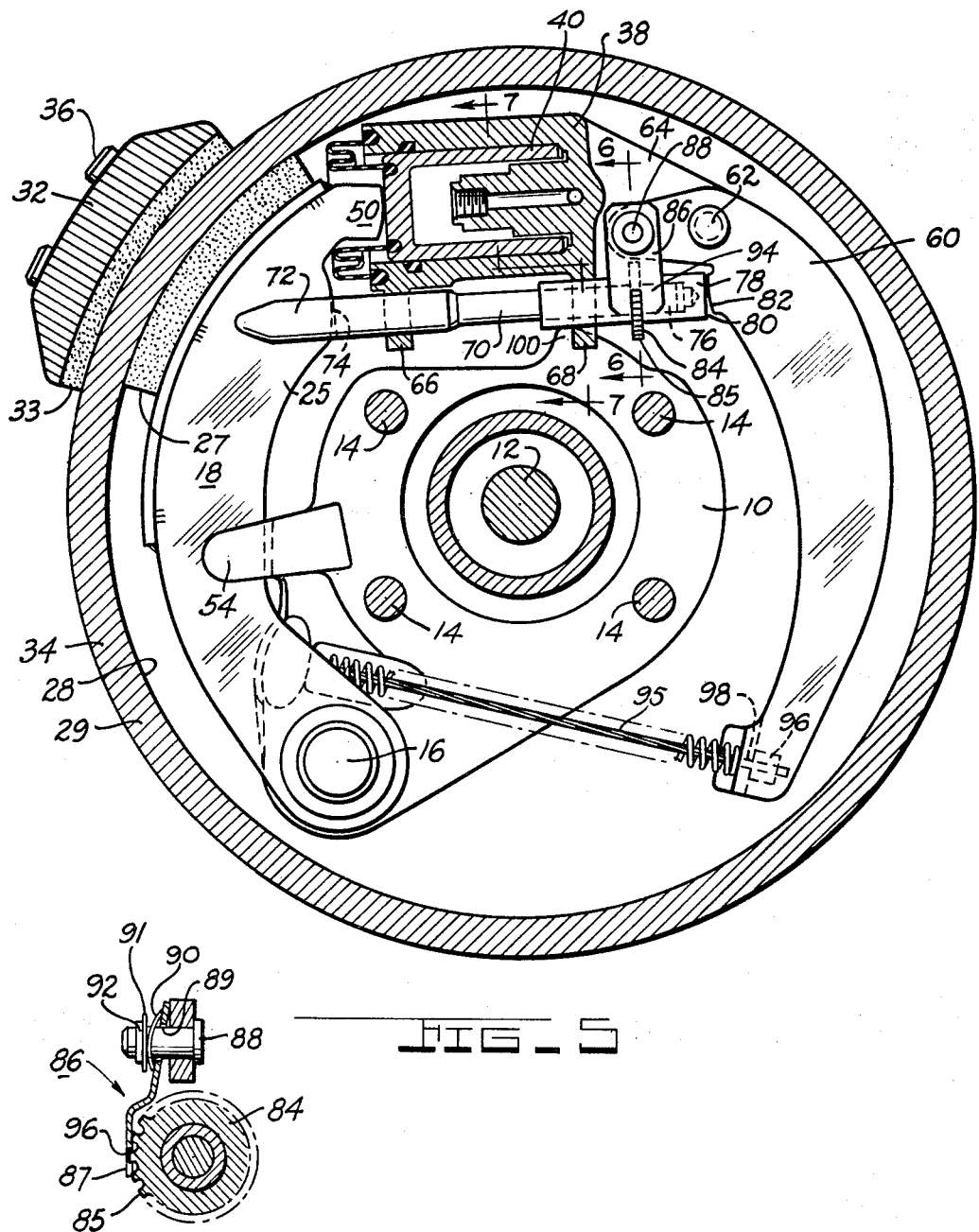
INVENTOR.
RICHARD T. BURNETT.
BY
*Sheldon F. Raizes*
ATTORNEY.

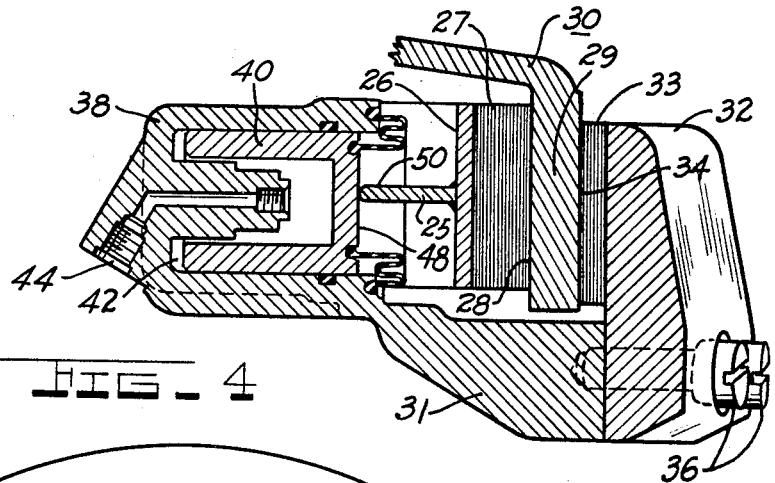

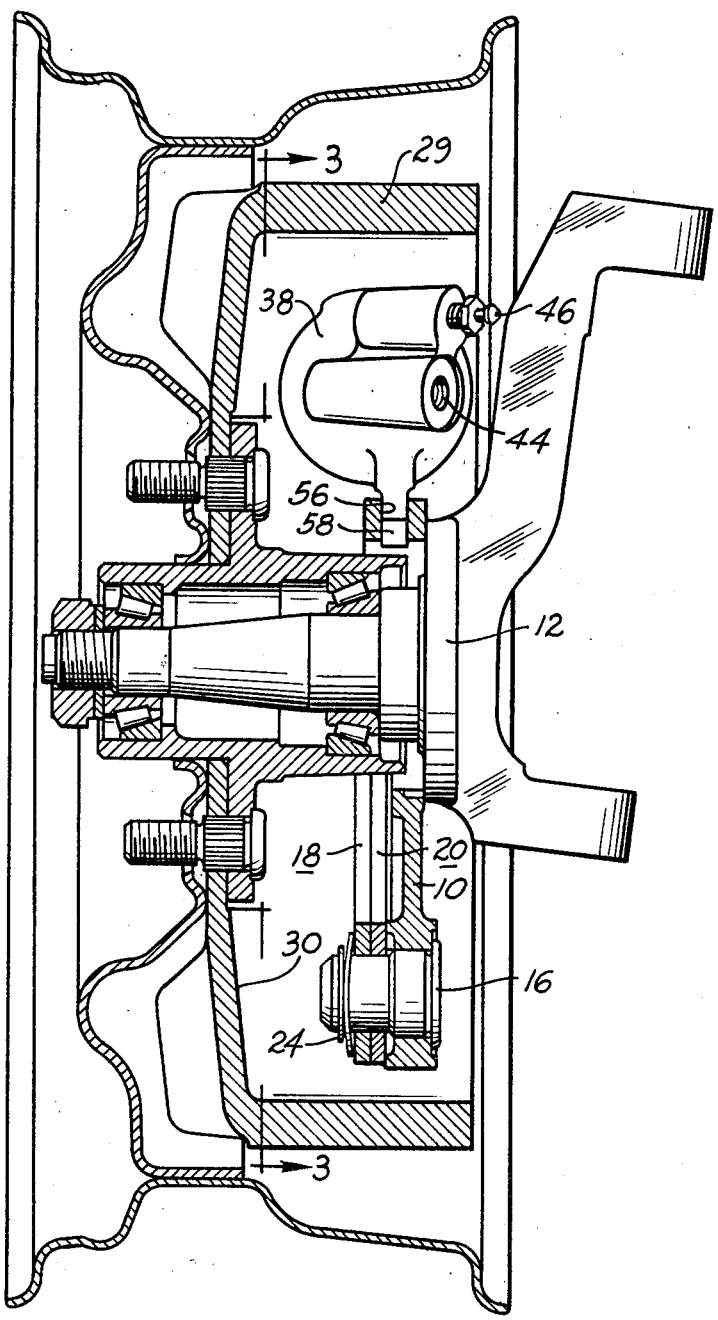

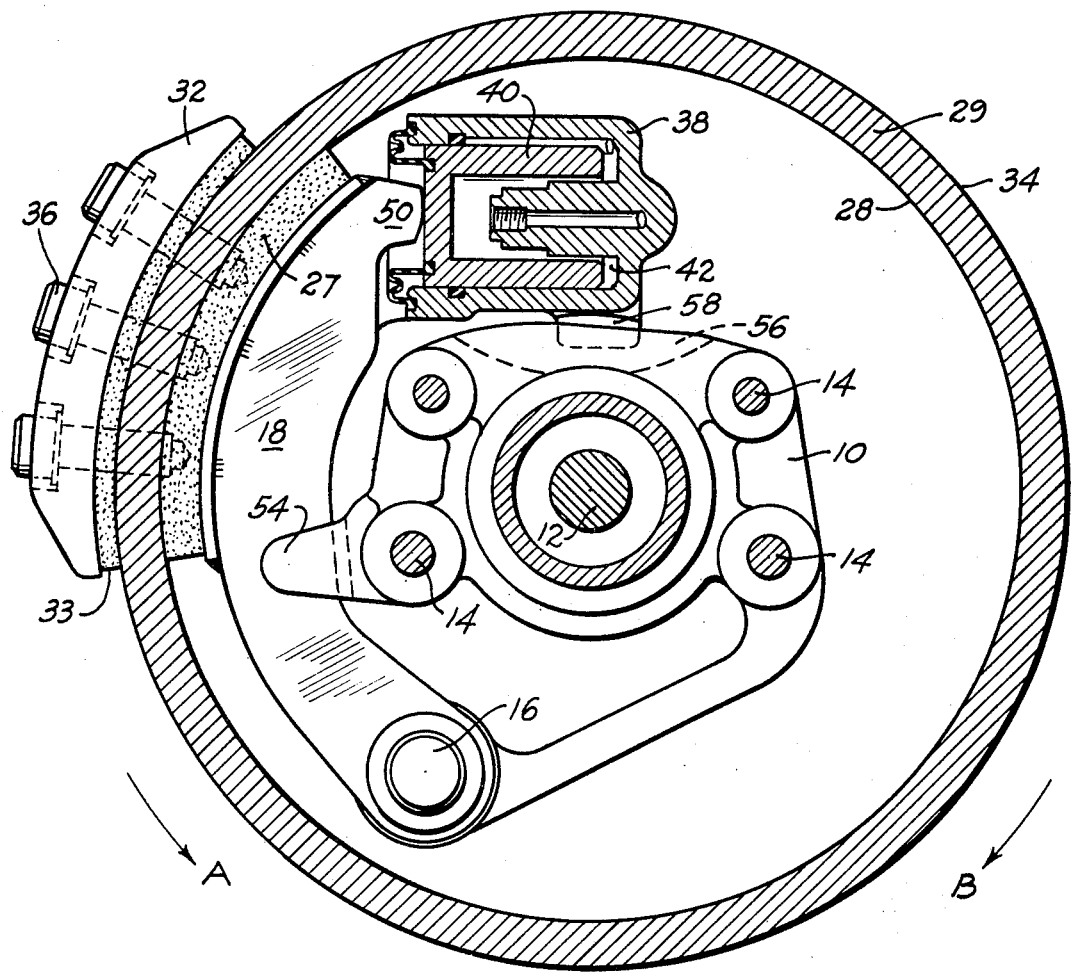
FIG_3
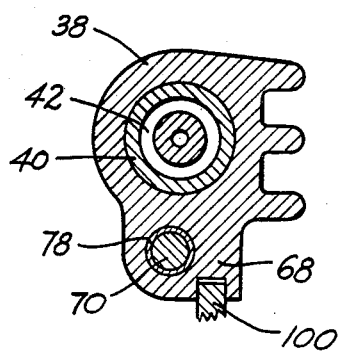
FIG_7
INVENTOR.
RICHARD T. BURNETT.
BY
*Sheldon F. Raizes*
ATTORNEY.

United States Patent Office 3,388,776
Patented June 18, 1968

3,388,776
TRANSVERSELY MOVABLE, OPPOSING, RIM GRIP BRAKE
Richard T. Burnett, South Bend, Ind., assignor to The Bendix Corporation, South Bend, Ind., a corporation of Delaware
Filed Dec. 23, 1963, Ser. No. 332,522
15 Claims. (Cl. 188—76)

This invention relates to a drum-caliper brake.

An object of this invention is to provide a brake which has the advantages of both a drum and a disc brake.

Another object of the invention is to provide a drum-caliper brake of an arrangement wherein one of a pair of friction members is self-energizing during rotation of the drum in one direction and the other friction member is self-energizing during rotation of the drum in the other direction.

Still another object is to transfer the braking torque exerted on each friction member by the drum directly through each friction member to stationary anchor means.

A further object of this invention is to provide the brake assembly with a mechanical actuator to be used for parking or emergency.

Yet another object of this invention is to provide an automatic adjuster for the mechanical actuator to compensate for brake shoe lining wear.

Other objects of the invention will become apparent from the following description with reference to the drawings wherein:

FIGURE 1 is a front elevational view of the brake assembly;

FIGURE 2 is a side elevational view of the brake assembly;

FIGURE 3 is a view of the brake assembly taken along section line 3—3 of FIGURE 2;

FIGURE 4 is a view taken along section line 4—4 of FIGURE 1;

FIGURE 5 is a rear elevational view of the brake assembly of FIGURE 1 only with a mechanical actuator added thereto;

FIGURE 6 is a view taken along section line 6—6 of FIGURE 5; and

FIGURE 7 is a view taken along section line 7—7 of FIGURE 5.

Referring to FIGURES 1–4, there is illustrated a stationary support 10 secured to a spindle 12 by bolts 14. A stationary anchor pin 16 is secured to the support 10 and pivotally receives thereon an arcuate T-shaped in cross section brake shoe 18 and an arcuate brake shoe 20. The brake shoes are secured to the anchor pin by a wave washer and a snap ring 24 secured in a groove of the anchor pin 16. The brake shoe 18 comprises a web 25, an arcuate rim 26 secured to the web, and a friction lining 27 secured to the rim 26 for engagement with the inner surface 28 of an annular flange 29 of a rotatable brake drum 30. The brake shoe 20 comprises a main portion 31 which is bent in an axial direction to cross a peripheral part of the flange 29 and comprises a backing plate 32 with a friction lining 33 secured thereto for engagement with the outer surface 34 of the flange 29. The backing plate 32 is secured to the main portion 31 by bolts 36.

A cylinder housing 38 is integral with the main portion 31 of the brake shoe 20 and has a piston 40 slidable within a chamber 42. A fluid inlet 44 and a bleeder screw 46 are provided on the housing 38 for communicating fluid to the chamber 42 to slide the piston outwardly from the cylinder and for bleeding the cylinder, respectively. The outer face 48 of the piston engages the end 50 of the web 25 of the brake shoe 18 for imparting an actuating force on the brake shoe 18 when the brakes are applied. The support 10 has a pair of axially spaced ledges 52, 54 for slidably guiding the main portion 31 of the brake shoe 20 and the web 25 of the shoe 18, respectively, and also has a slot 56 which receives a projection 58 on the cylinder housing for guiding the cylinder housing during brake application.

The axis of the cylinder housing 38 is removed from the axis of the brake drum 30 and the anchor pin 16 to provide an applying moment arm about the anchor pin 16 which is at least as great as the inner radius of the drum 30 in order to minimize the cylinder diameter. The location of the cylinder housing 38 relative to the axis of the drum 30 permits the utilization of a mechanical actuator which is similar to a conventional one.

In operation, and assuming rotation of the brake drum 30 in the direction of arrow A, fluid pressure will be admitted into the fluid chamber 38 displacing the piston 40 to the right (FIGURE 1) thereby urging the brake shoe 18 into engagement with the inner surface 28 of the brake drum 30. Upon engagement of the brake shoe 18 with the drum 30, pressure reaction will slide the cylinder housing 38 and thus the brake shoe 20 to the left (FIGURE 1) to engage the brake lining 33 with the outer surface 34 of the brake drum 30. The braking torque imparted on the brake linings 27, 33 by the drum 30 will be transferred directly through each of their respective brake shoes to the anchor pin 16 on the support 10.

Upon brake application during rotation of the brake drum in the direction of arrow A, the brake drum acts on the shoe 18 tending to rotate it clockwise about anchor pin 16 thereby creating a self energizing effect aiding the piston 40 in applying the lining 27 of the brake shoe 18 into engagement with the inner surface 28 of the drum 30. Upon brake drum rotation in the direction of arrow B, the brake drum 30 will act on the friction lining 33 of the shoe 20 tending to rotate it counterclockwise about anchor pin 16 and thereby producing a self energizing effect aiding in applying the friction lining 33 to the outer surface 34 of the drum 30. Therefore, a self energizing effect is applied on one of the brake shoes by the drum upon a brake application when the drum is rotating in either direction.

Another feature of this construction is that the brake shoes can readily adjust to drum expansion and/or deflection during brake application since the shoes each pivot or swing about the anchor pin 16.

With reference to FIGURE 5, there is illustrated the same brake assembly as that of FIGURE 1, only including a mechanical actuator and an automatic adjuster therefor. A mechanical actuating lever 60 is pivotally mounted by a pin 62 to an extension 64 of the cylinder housing 38. A pair of flanges 66 and 68 extend from the cylinder housing 38 and have openings which receive a rod 70 therethrough. The rod is slotted at one end 72 and receives the web 25 of the brake shoe 18 thereon which engages the edge 74 of the slot. The other end 76 of the rod 70 is threaded and receives an internally threaded rotatable sleeve 78 therein. The rotatable sleeve 78 extends through the opening on the flange 68 and has an end surface 80 for engagement by an abutting surface 82 of the lever 60 and also has a star wheel 84 integral therewith having a plurality of teeth or serrations 85 on its outer periphery. A pawl 86 is retained at one end on the lever 60 by a pin 88 extending through an opening 89 therein, a wave washer 90, a flat washer 91 and a snap ring 92. A slot is at the other end of the pawl 86. The side portions 94 of the slot straddle the wheel 84 for guiding the lever thereon and the closed end 96 of the slot engages one of the teeth for rotating the same. A cable 95 is connected at one end to the other end of the lever 60 and extends through a slot 98 and held therein by a button 96, and is connected at the other end to a manual parking brake lever (not shown). The flange 68 of the cylinder is slotted (FIGURE 7) to receive a projecting portion 100 of the support 10 to slidably guide the cylinder.

In operation, upon pulling of the cable 95, the lever 60 will be turned clockwise about the pivot 62 with the abutment 82 engaging the surface 80 of the sleeve, rod combination to force the rod 70 and the brake shoe 18 to the left (FIGURE 5) to thrust the lining 27 of the shoe 18 into engagement with the inner surface 28 of the brake drum 30. Upon further pivoting of the lever 60 in a clockwise direction, the lever 60 will fulcrum on the surface 80 of the sleeve 78 thereby pulling and effecting sliding of the cylinder housing 38 and shoe 20 to the right to bring the friction lining 33 into engagement with the outer surface 36 of the brake drum 30. If the pivotal movement of the lever 60 is such that the pawl 86 picks up a new tooth 85 of the serrated wheel 84, then upon return of the lever 60 to its normally released position, the serrated wheel 84 will be rotated by the pawl 86 thereby effecting rotation of the sleeve 78 on the rod 70 and thus extending the length of the combination rod and sleeve resulting in adjustment of the mechanical actuator for wear of the brake linings 27 and 33.

It should be realized that with slight modifications, the pawl 86 could be adapted to turn the serrated wheel 84 upon the applying stroke of the lever 60 rather than upon its return if it should be desired.

Although this invention has been illustrated and described in connection with specific embodiments, numerous other adaptations of this invention will become apparent to those skilled in the art. I intend to include within the scope of the following claims all equivalent applications of the invention whereby the same or substantially the same results will be obtained.

I claim:

1. In a brake having a drum rotatable about an axis: said drum comprising an annular rim having inner and outer opposed friction surfaces, a fixed support member, said support member having anchor means thereon, a pair of brake shoes having friction material thereon, one of said brake shoes being arranged to engage its respective friction material with said inner friction surface and the other of said brake shoes being arranged to engage its respective friction material with said outer friction surface, each of said brake shoes being individually pivotally mounted on said anchor means, a lever pivotally secured to one of said brake shoes and a strut interconnecting the other of said brake shoes with said lever, whereby upon actuation of said lever, said lever will apply said last named other brake shoe into engagement with said drum and then fulcrum upon said strut to engage said last named one shoe into engagement with said drum, said strut comprising a pair of relatively rotatable members for adjusting the length of said strut, a toothed wheel secured to one of said rotatable members, a pawl secured to said lever and having a portion biased into engagement with the toothed portion of said wheel, whereby upon rotation of said lever in one direction, said pawl will turn said wheel to adjust the length of said strut to compensate for wear of said brake shoes.

2. A brake having a rotatable drum: said drum having an annular rim having inner and outer opposed friction surfaces, a fixed support, said support having anchor means thereon, a pair of brake shoes having friction material thereon, one of said brake shoes being arranged to engage its respective friction material with said inner friction surface and the other of said brake shoes being arranged to engage its respective friction material with said outer friction surface, each of said shoes being individually pivotally mounted at one end on said anchor means, a cylinder housing rigidly connected with the other end of one of said shoes, a piston slidable in said housing and engaging the other end of the other of said shoes, said cylinder housing being moveable relative to said support member, whereby upon fluid actuation of said brake said piston will apply its respective brake shoe into engagement with its respective friction surface and fluid pressure reaction will shift said cylinder housing and thereby engage its respective brake shoe into engagement with its respective friction surface, a lever pivotally secured to an extension on said cylinder housing and a strut interconnecting said last named other brake shoe with said lever, whereby upon actuation of said lever, said lever will apply said last named other brake shoe into engagement with said drum and then fulcrum upon said strut to engage said last named one shoe into engagement with said drum.

3. The structure as recited in claim 2 wherein said anchor means is an anchor pin.

4. The structure as recited in claim 2, wherein said support member, said anchor means and said cylinder housing are located within the boundary of said drum, said support member has guide means for each of said shoes and for said cylinder housing, each of said shoes and said cylinder housing having a portion slidably disposed within said guide means.

5. The structure as recited in claim 3, wherein said anchor pin and said cylinder housing are located within the boundary of said drum.

6. The structure as recited in claim 3, wherein said support member, said anchor pin, said cylinder housing, and said lever, are located within the boundary of said drum, said support member having guide means for each of said shoes and for said cylinder housing, each of said shoes and said cylinder housing having a portion slidably disposed within said guide means.

7. The structure as recited in claim 6, wherein the moment arm between said anchor pin and the line of force exerted by said piston and said cylinder housing on said brake shoes is at least equal to the inner radius of said drum.

8. The structure as recited in claim 2, wherein said strut comprises: a pair of relatively rotatable members for adjusting the length of said strut, a toothed wheel secured to one of said rotatable members, a pawl secured to said lever and having a portion biased into engagement with the toothed portion of said wheel, whereby upon rotation of said lever in one direction, said pawl will turn said wheel to adjust the length of said strut to compensate for wear of said friction material.

9. A brake having a drum rotatable about an axis comprising: said drum having an annular rim having inner and outer opposed friction surfaces, a fixed support located within the boundary of said drum, said support having an anchor pin thereon, a pair of brake shoes, one of said brake shoes comprising a web which is transverse to the axis of rotation and a rim transverse to said web attached to said web, friction material secured to said brake shoe rim for engagement with said inner surface of said drum, one end of said web being pivotally attached to said anchor pin for pivotal movement of said one brake shoe toward and away from said inner surface of said drum, the other of said brake shoes comprising a member extending across a portion of the periphery of said annular rim and a flange extending opposite said outer surface of said drum, friction material secured to said flange for engagement with said outer surface of said drum, one end of said other brake shoe being pivotally attached to said anchor pin for allowing movement of its respective friction material toward and away from said outer surface of said drum, a fluid actuator comprising a cylinder housing at the other end of said other shoe rigidly connected therewith and a piston slidable in said housing and operatively connected to the other end of said one brake shoe, said support member having guiding means for said housing and each of said shoes, said shoes and said housing each having a portion slidably disposed within said guiding means, whereby upon actuation of said brake said one brake shoe is moved by said piston into engagement with said inner surface and fluid pressure reaction will move said housing relative to said support member to bring said other brake shoe into enagagement with said outer surface.

10. The structure as recited in claim 9, wherein: the moment arm between said anchor pin and the line of force exerted by said piston and said cylinder housing on said brake shoes is at least equal to the inner radius of said drum.

11. The structure as recited in claim 10, wherein: a lever is pivotally secured to an extension on said cylinder housing and a strut interconnects the web of said one brake shoe with said lever, whereby upon actuation of said lever, said lever will thrust said one brake shoe into engagement with said drum and then fulcrum upon said strut to pull said other shoe into engagement with said drum.

12. The structure as recited in claim 11, wherein said strut comprises: a pair of relative rotatable members for adjusting the length of said strut, a toothed wheel secured to one of said rotatable members, a pawl secured to said lever and having a portion biased into engagement with the toothed portion of said wheel, whereby upon rotation of said lever in one direction, said pawl will turn said wheel to adjust the length of said strut to compensate for wear of said friction material.

13. A brake having a drum rotatable about an axis comprising: said drum having an annular rim having inner and outer opposed friction surfaces, a fixed support located within the boundary of said drum, said support having an anchor pin thereon, a pair of brake shoes, one of said brake shoes comprising a web which is transverse to the axis of rotation and a rim transverse to said web attached to said web, friction material secured to said brake shoe rim for engagement with said inner surface of said drum, one end of said web being pivotally attached to said anchor pin for pivotal movement of said one brake shoe toward and away from said inner surface of said drum, the other of said brake shoes comprising a member extending across a portion of the periphery of said annular rim and a flange extending opposite said outer surface of said drum, friction material secured to said flange for engagement with said outer surface of said drum, one end of said other brake shoe being pivotally attached to said anchor pin for allowing movement of its respective friction material toward and away from said outer surface of said drum, a fluid actuator comprising a cylinder housing at the other end of one of said shoes rigidly connected therewith and a piston slidable in said housing and operatively connected to the other end of the other of said brake shoes, said support member having guiding means for said housing and each of said shoes, said shoes and said housing each having a portion slidably disposed within said guiding means, whereby upon actuation of said brake, said cylinder housing and said piston are moved in opposite directions to engage said shoes with their respective friction surfaces.

14. The structure as recited in claim 13, wherein: a lever is pivotally secured to an extension on said cylinder housing and a strut interconnects said last named other brake shoe with said lever, whereby upon actuation of said lever, said lever will apply said last named other brake shoe into engagement with said drum and then fulcrum upon said strut to engage said last named one shoe into engagement with said drum.

15. In a brake the combination of
a rotatable member,
a non-rotatable torque plate,
an endless ring disc operatively affixed to the rotatable member,
a housing mounted to the torque plate for pivotal movement in relation thereto and substantially in the plane thereof and operatively positioned around said ring disc,
a cylinder formed in the radially inner side of said housing,
a piston movably received in said cylinder and operatively aligned adjacent the radially inner surface of said ring disc,
a first friction pad received in the radially outer side of said housing and adapted to engage the radially outer surface of said ring disc upon pivotal movement of said housing in one direction,
an arm mounted to said torque plate for pivotal movement in relation thereto and substantially in the plane thereof and operatively positioned between the radially outer end of said piston and the radially inner surface of said ring disc, and
a second friction pad received on the radially outer surface of said arm and adapted to engage the radially inner surface of the ring disc in substantially opposed relationship to said first friction pad upon the pivotal movement of said arm in a direction opposite to said one direction of pivotal movement of said housing.

References Cited
UNITED STATES PATENTS

| | | | |
|---|---|---|---|
| 2,201,293 | 5/1940 | Hoppenstand | 188—76 |
| 2,265,578 | 12/1941 | Rosenberg | 188—76 |
| 2,787,340 | 4/1957 | Murphy | 188—76 |
| 3,098,545 | 7/1963 | Murphy | 188—76 |
| 3,129,789 | 4/1964 | Hodkinson | 188—79.5 |
| 2,285,241 | 6/1942 | Walther et al. | |

FERGUS S. MIDDLETON, *Primary Examiner.*

EUGENE G. BOTZ, ARTHUR L. LA POINT, MILTON BUCHLER, *Examiners.*

G. E. A. HALVOSA, *Assistant Examiner.*